J. DENNIS, Jr.
Tree-Protector.
No. 799.
Patented June 21, 1838
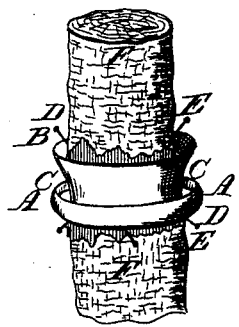

UNITED STATES PATENT OFFICE.

JONATHAN DENNIS, JR., OF PORTSMOUTH, RHODE ISLAND.

IMPROVEMENT IN THE MODE OF PREVENTING CANKER-WORMS OR OTHER INSECTS FROM ASCENDING FRUIT OR OTHER TREES.

Specification forming part of Letters Patent No. 799, dated June 21, 1838.

*To all whom it may concern:*

Be it known that I, JONATHAN DENNIS, Jr., of Portsmouth, in the county of Newport and State of Rhode Island, have invented a new and Improved Mode of Preventing Canker-Worms or other Insects from Ascending Fruit or other Trees; and I do hereby declare that the following is a full and exact description.

The nature of my invention consists in putting a circular metallic trough with a roof round the tree, composed of one entire piece of metal, and bending it to conform to the shape of the tree, setting it off from the tree, and calking the space between the trough and the tree with any substance that is sufficiently firm to prevent canker-worms or other insects from passing through it, but that will be easily compressed by the growth of the tree.

To enable others skilled in the art to make and use my invention, I will proceed to describe its construction and use.

I make a trough and roof of one piece of lead or any metal and bend it round the tree, so that it will conform to the shape of the tree, and solder the ends together, so as to make a complete circular trough and roof, as shown in the accompanying drawing, to be filled with oil or any composition that will destroy canker-worms or other insects.

A A is the edge of the trough; B B, the edge of the roof projecting beyond the edge of the trough, to prevent the rain from falling into the oil C C or composition, so as to make it run over- or waste, and to prevent pieces of bark, sticks, or any other substance from falling into the trough and forming a bridge for the canker-worms or other insects to pass over the oil or composition in the trough. The trough should be set one inch or less from the tree, and held level by the nails D D, driven into the tree above and below the trough, and projecting out to support it in its place. The space E E between the trough and the tree may be calked with cotton-waste, hay, straw, moss, sea-weed, or any substance that will prevent canker-worms or other insects from passing between the trough and the tree, and that will be easily compressed by the growth of the tree.

F F is the body of the tree.

What I claim as my invention, and desire to secure by Letters Patent, is—

A circular metallic trough and roof made of one piece of metal and bent to conform to the shape of the tree, using for that purpose any metal that can be wrought into the proper shape.

JONATHAN DENNIS, JR.

Witnesses:
 JOSHUA WILBOUR,
 H. ROURMANIERE.